United States Patent
Lee et al.

(10) Patent No.: US 9,144,858 B2
(45) Date of Patent: Sep. 29, 2015

(54) PLASMA GENERATING SYSTEM HAVING MOVABLE ELECTRODES

(71) Applicants: Sang Hun Lee, San Ramon, CA (US); Toru Tanibata, Cupertino, CA (US); Orion Weihe, Saratoga, CA (US)

(72) Inventors: Sang Hun Lee, San Ramon, CA (US); Toru Tanibata, Cupertino, CA (US); Orion Weihe, Saratoga, CA (US)

(73) Assignee: ReCarbon Inc., Santa Clara, CA (US)

( * ) Notice: Subject to any disclaimer, the term of this patent is extended or adjusted under 35 U.S.C. 154(b) by 301 days.

(21) Appl. No.: 13/677,330

(22) Filed: Nov. 15, 2012

(65) Prior Publication Data

US 2013/0126488 A1      May 23, 2013

Related U.S. Application Data (60) Provisional application No. 61/561,759, filed on Nov. 18, 2011.

(51) Int. Cl.
*B23K 10/00* (2006.01)
*H05H 1/48* (2006.01)
*H05H 1/46* (2006.01)

(52) U.S. Cl.
CPC .............. *B23K 10/00* (2013.01); *H05H 1/46* (2013.01); *H05H 1/48* (2013.01); *H05H 2001/4622* (2013.01)

(58) Field of Classification Search
CPC ................................. H05H 1/46; B23K 10/00
USPC ............. 219/121.48, 121.52, 121.57; 373/11, 373/19, 62; 422/186, 186.04, 186.21
See application file for complete search history.

(56) References Cited

U.S. PATENT DOCUMENTS

| | | | |
|---|---|---|---|
| 5,352,294 A * | 10/1994 | White et al. | 118/725 |
| 5,501,740 A | 3/1996 | Besen | |
| 5,994,663 A | 11/1999 | Lu | |
| 6,169,370 B1 | 1/2001 | Platzer | |
| 6,452,315 B1 * | 9/2002 | Vane | 313/231.31 |
| 2003/0175181 A1 * | 9/2003 | Hall et al. | 422/186 |
| 2009/0128041 A1 * | 5/2009 | Urayama et al. | 315/111.21 |
| 2012/0145041 A1 * | 6/2012 | Walters | 106/472 |

FOREIGN PATENT DOCUMENTS

| | | | | |
|---|---|---|---|---|
| GB | 2273027 A * | 6/1994 | | |
| JP | 07194037 A * | 7/1995 | | H02J 17/00 |
| JP | 2010-003462 A | 1/2010 | | |
| KR | 10-2011-0007583 A | 1/2011 | | |
| WO | WO 2010142953 A1 * | 12/2010 | | B01J 19/08 |

* cited by examiner

Primary Examiner — Thien S Tran
(74) Attorney, Agent, or Firm — Patent Office of Dr. Chung Park (57) ABSTRACT

A plasma generating system is provided. The plasma generating system includes: a pair of electrodes having distal ends; an electrode holder holding the pair of electrodes; a gate having a surface on which the electrode holder is slidably mounted and adapted to be controlled by sliding the electrode holder on the surface; and a resilient member secured to the gate and adapted to generate a force to close the opening. The distal ends are adapted to move into an opening of the gate as the electrode holder slides along a direction on the surface and adapted to generate an electric arc to thereby ignite plasma in a gas.

8 Claims, 8 Drawing Sheets

PLASMA GENERATING SYSTEM HAVING MOVABLE ELECTRODES

CROSS REFERENCE TO RELATED APPLICATIONS

This application claims the benefit of U.S. Provisional Applications No. 61/561,759, entitled "Plasma generating system having movable electrodes," filed on Nov. 18, 2011, which is incorporated by reference in its entirety.

BACKGROUND OF THE INVENTION

1. Field of the Invention

The present invention relates to plasma generators, and more particularly to devices having movable electrodes for igniting plasma plumes.

2. Discussion of the Related Art

In recent years, the progress on producing plasma by use of microwave energy has been increasing. Typically, a plasma producing system includes a device for generating microwave energy and a nozzle that receives the microwave energy to excite gas flowing through the nozzle into plasma. One of the difficulties in operating a conventional plasma producing system is making an ignition system that does not interfere with the microwave energy in the nozzle. For example, a conventional ignition system includes an electrode having a tip remaining in the nozzle after ignition. The tip heated by the microwave energy in the nozzle is eroded to suffer a shortening of its lifespan. Also, the mechanism for holding the electrode may cause the leakage of microwave energy from the nozzle. Thus, there is a need for an ignition system which ignites plasma plumes in the nozzle that reduces leaking and/or interfering with the microwave energy in the nozzle.

SUMMARY OF THE INVENTION

In one embodiment of the present disclosure, a plasma generating system includes: a pair of electrodes having distal ends; an electrode holder holding the pair of electrodes; a gate having a surface on which the electrode holder is slidably mounted and adapted to be controlled by sliding the electrode holder on the surface; and a resilient member secured to the gate and adapted to generate a force to close the opening. The distal ends are adapted to move into an opening of the gate as the electrode holder slides along a direction on the surface and adapted to generate an electric arc to thereby ignite plasma in a gas.

In another embodiment of the present disclosure, a plasma generating system includes: an electrode having a distal end; a waveguide having a wall, the wall having a hole through which the electrode passes and at least one opening for receiving a first gas therethrough; and an actuator coupled to the electrode and adapted to move the electrode relative to the wall. The distal end and the hole are configured to form a gap for receiving a second gas therethrough. Also, the distal end is adapted to move into the waveguide and generate an electric arc to thereby ignite the second gas into plasma during operation.

DETAILED DESCRIPTION OF THE PREFERRED EMBODIMENTS

Figure 1A:
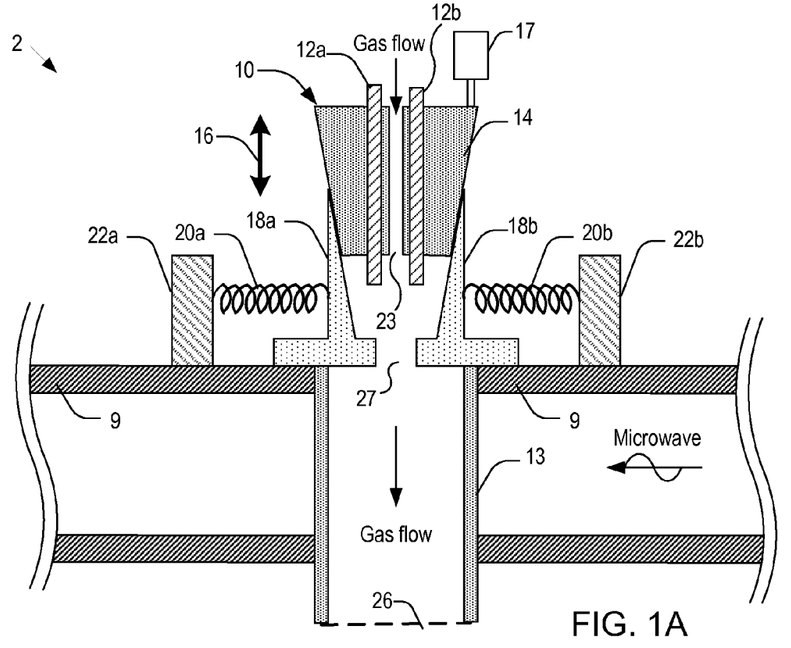
FIG. 1A shows a schematic diagram of a plasma generating system in accordance with one embodiment of the present invention, where an ignition system is retracted from a cavity.

FIG. 1A shows a schematic diagram of a plasma generating system 2 in accordance with one embodiment of the present invention. As depicted, the plasma generating system 2 includes: a plasma ignition system 10; a waveguide 9; and a gas flow tube 13 disposed in the waveguide 9 and formed of microwave transparent material, such as quartz. Microwave energy, which is generated by a microwave source (such as magnetron, not shown in FIG. 1A), may be transmitted through the waveguide 9. Here, the terms nozzle and gas flow tube are used interchangeably since the gas flow tube 13 operates as a nozzle through which the gas flows. In such arrangements, the gas flow tube operates as a resonant cavity, and thus, the terms resonant cavity (or, shortly, cavity) and gas flow tube are used interchangeably. The outlet of the gas flow tube 13 may be blocked by a mesh 26, where the spacing between cords of the mesh 26 is small enough to block the leakage of microwave energy therethrough.

The plasma ignition system 10 includes: a pair of electrodes 12a and 12b; a pair of gates 18a and 18b; an electrode holder 14 slidably mounted on the slanted surfaces of the gates 18a and 18b and formed of dielectric material; a pair of resilient members, such as compression springs, 20a and 20b; and a pair of stops 22a and 22b secured to the waveguide 9, with each of the stop holding one end of the corresponding resilient member in place relative to the waveguide 9.

The pair of gates 18a and 18b is formed of microwave opaque material, such as metal, and slidably mounted on the waveguide 9 so that it can move parallel to the top surface of the waveguide 9. FIG. 1C shows a top view of the electrode holder 14. As depicted, the pair of electrodes 12a and 12b is secured to the electrode holder 14 and the electrode holder 14 has a throughpass hole 23. The electrode holder 14, formed of dielectric material, electrically insulate the pair of electrodes 12 and 12b from each other so that the electric arc 28 is generated at the distal ends of the pair of electrodes. The electrode holder 14 may be moved upwardly or downwardly as indicated by an arrow 16 by an actuator 17. It should be apparent to those of ordinary skill in the art that the actuator 17 may be of any suitable type, such as electrical actuator. As the electrode holder 14 is moved downwardly, the gates 18a and 18b move parallel to the waveguide 9 so that the opening or aperture 27 is enlarged while the resilient members 20a and 20b are being compressed.

Figure 1B:
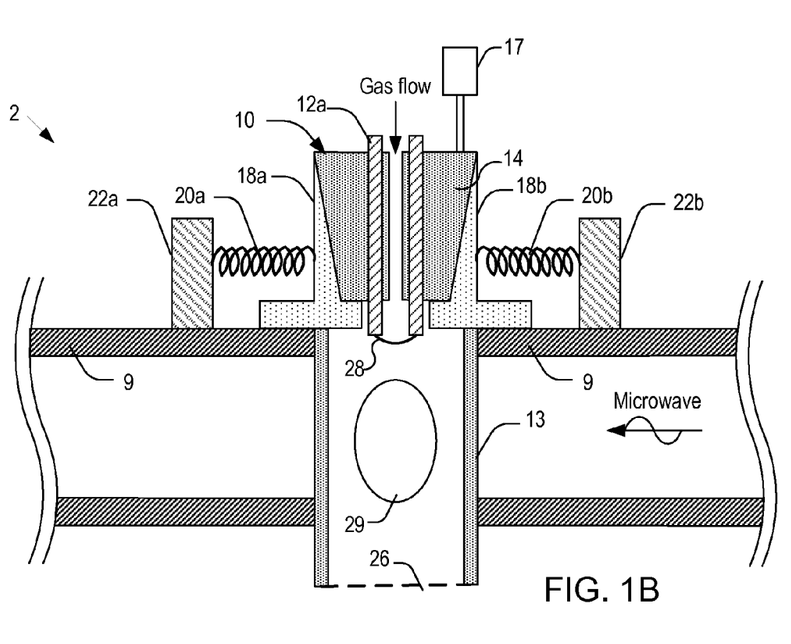
FIG. 1B shows a schematic diagram of the plasma generating system in FIG. 1A, where the ignition system is advanced into the cavity to ignite plasma in the cavity.
Figure 1C:
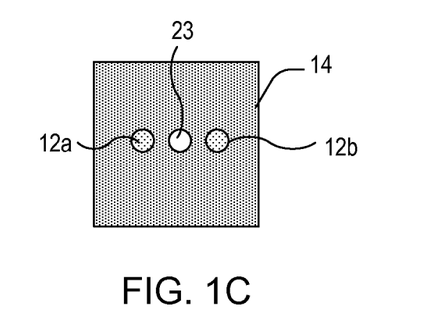
FIG. 1C shows a top view of an electrode holder in FIG. 1A.

As the electrode holder 14 further moves down, the distal ends of the electrodes 12a and 12b are advanced into the cavity or gas flow tube 13, as depicted in FIG. 1B. FIG. 1B shows a schematic diagram of the plasma generating system 2, where the ignition system 10 is fully advanced into the gas flow tube 13. Then, while the gas flows through the throughpass hole 23 formed in the electrode holder 14, the operator may apply a high voltage to the electrodes 12a and 12b to form an electric arc 28 at the distal ends of the electrodes. (For brevity, the high voltage source electrically connected to the proximal ends of the electrodes 12a and 12b is not shown in FIG. 1A.) The electric arc generates ionized gas particles in the gas flow tube 13, which in turn ignites a plasma plume 29 in conjunction with the microwave energy flowing through the gas flow tube 13. Optionally, the electrode holder 14 may be interlocked with a triggering mechanism (not shown in FIG. 1B) that triggers the electric arc only when the electrode holder 14 is at its lowest position.

Figure 1D:
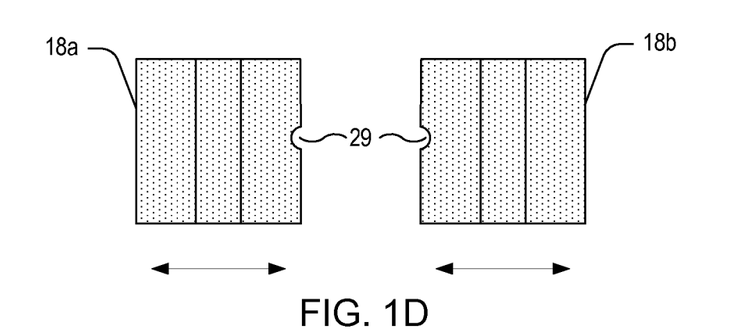
FIG. 1D shows a top view of a pair of gates in FIG. 1A, where the gates are open to pass the ignition system therethrough.
Figure 1E:
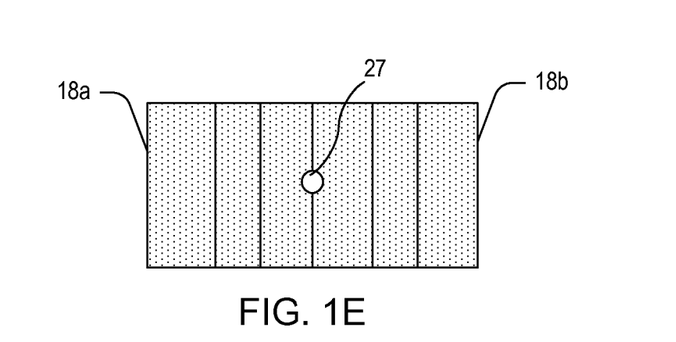
FIG. 1E shows a top view of the pair of gates in FIG. 1A, where the gates are closed to block the microwave leakage therethrough during operation.

Upon establishing the plasma plume 29, the distal end of the ignition system 10 may be retracted from the cavity by moving the ignition system 10 upwardly, i.e., the ignition system 10 is returned to the position in FIG. 1A. As the ignition system 10 retracts, the size of the aperture 27 decreases by the restoring force of the resilient members 20a and 20b so that the microwave leakage through the aperture 27 is reduced. FIG. 1D shows a top view of the pair of gates 18a and 18b in FIG. 1A, where the gates are fully open to pass the electrodes 12a and 12b therethrough. FIG. 1E shows a top view of the pair of gates 18a and 18b in FIG. 1A, where the gates are closed to block the microwave leakage therethrough when the electrodes 12a and 12b are fully retrieved. As depicted, each of the gates 18a and 18b includes a recess 29. As discussed above, the gates 18a and 18b are closed by the resilient members 20a and 20b when the ignition system 10 is fully retrieved. Then, the recesses 29 in the gates 18a and 18b will form the aperture 27 so that the gas flowing through the hole 23 passes therethrough and is fed into the plasma plume 29, to thereby sustain the plasma plume 29 in the gas flow tube 13.

Unlike most conventional systems, the electrodes 12a and 12b are retracted when the plasma plume 29 is established. If the tips of the electrodes 12a and 12b were to remain in the gas flow tube 13 during operation, the microwave energy in the gas flow tube 13 would be picked up by the electrodes 12a and 12b. Also, the tips of the electrodes 12a and 12b would interact with plasma inside the cavity, where the interaction would erode the tips of the electrodes. Thus, the ignition system 10, by retracting the tips of the electrodes 12a and 12b, reduces the erosion of the electrode tips. Furthermore, the microwave leakage through the aperture 27 is reduced as the aperture 27 is reduced during operation. As such, the ignition system 10 enhances the efficiency of the overall system. In one embodiment, the diameter of the aperture 27 is few orders of magnitude smaller than the wavelength of the microwave in the waveguide 9 so that there will be no leakage through the gates 18a and 18b, further enhancing the system efficiency.

In FIGS. 1D and 1E, the aperture 27 is formed by a pair of recesses 29 in the gates 18a and 18b. However, it should be apparent to those of ordinary skill in the art that other suitable types of mechanism, such as iris having multiple fingers, may be used to control the diameter of the aperture 27.

Figures 2A, 2B:
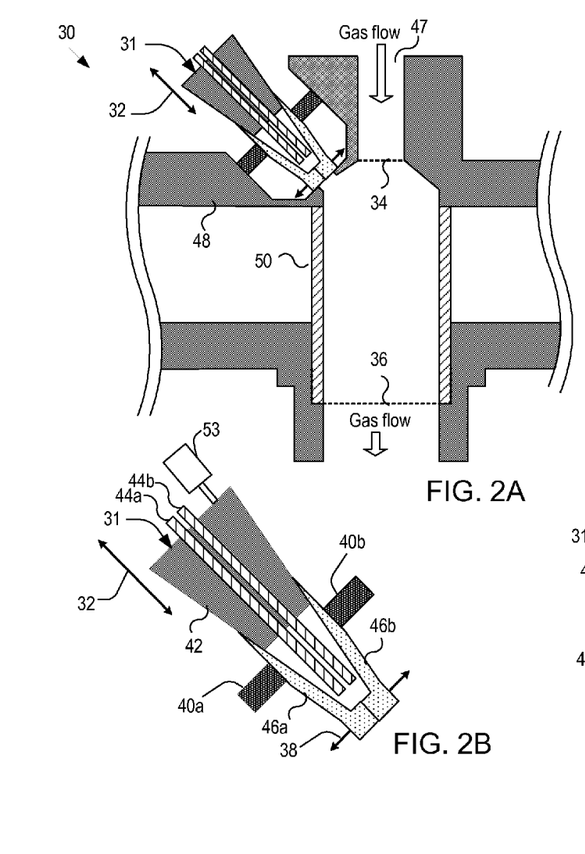
FIG. 2A shows a schematic diagram of a plasma generating system in accordance with another embodiment of the present invention, where an ignition system is retracted from a cavity.
FIG. 2B is an enlarged view of the ignition system in FIG. 2A.
Figure 2C:
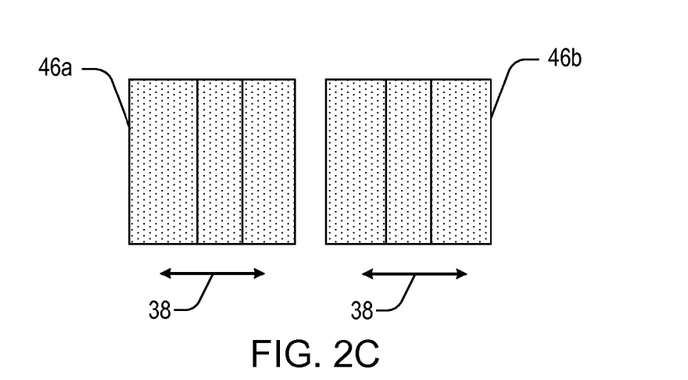
FIG. 2C shows a top view of a pair of gates in FIG. 2A.

FIG. 2A shows a schematic diagram of a plasma generating system 30 in accordance with another embodiment of the present invention, where an ignition system 31 is retracted from a cavity surrounded by a gas flow tube 50, a waveguide 48, and two meshes 34 and 36. FIG. 2B is an enlarged view of the ignition system 31 in FIG. 2A. FIG. 2C shows a top view of the pair of gates 46a and 46b in FIG. 2B. As depicted, the structure and operational mechanisms of the waveguide 48, the gas flow tube 50, the pair of electrodes 44a and 44b, the electrode holder 42, the pair of gates 46a and 46b, and the pair of resilient members 40a and 40b are similar to their counterparts of the plasma generating system 2 in FIG. 1A, the difference being that the gas is not provided through the electrode holder 42 and the pair of meshes 34 and 36 are used to block the microwave leakage. Instead, the working gas is introduced into the gas flow tube 50 through a gas passageway 47 formed in the wall of the waveguide 48. As the electrode holder 42 is moved along the direction of an arrow 32 by an actuator 53, the pair of gates 46a and 46b slide along the direction of an arrow 38. It should be apparent to those of ordinary skill in the art that the actuator 53 may be of any suitable type, such as electrical actuator. The pair of gates 46a and 46b do not include any recess similar to the recess 29 in FIG. 1D, i.e., the gates 46a and 46b do not have any aperture when they are closed, as depicted in FIG. 2C, since the gas is introduced through the gas passageway 47.

In another embodiment, the electrode holder 42 may include a throughpass hole as the electrode holder 14 in FIG. 1A. In such arrangements, the ignition gas may pass through the hole formed in the electrode holder while the working gas may pass through the gas passageway 47, i.e., the ignition gas, which may different from the working gas, is introduced into the gas flow tube 50 during the initial ignition process.

Figures 2D, 2E:
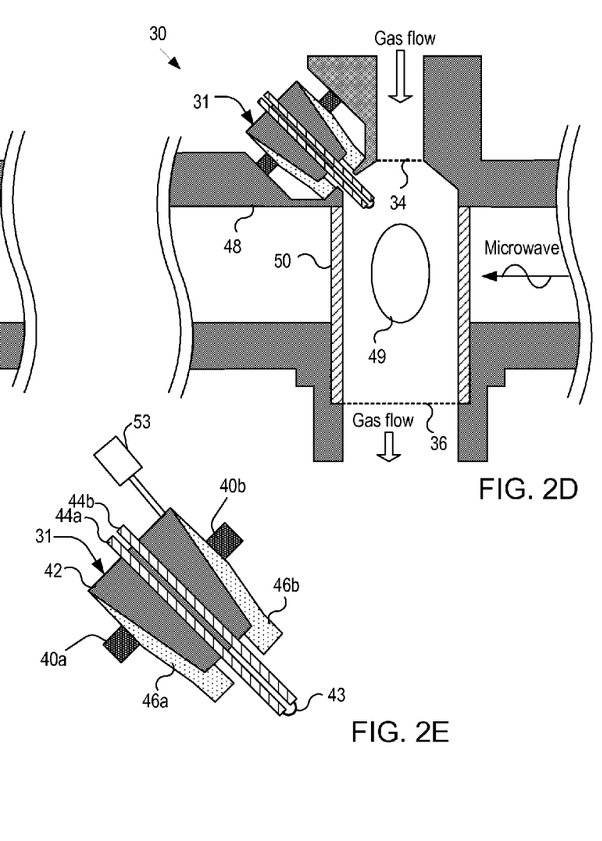
FIG. 2D shows a schematic diagram of the plasma generating system in FIG. 2A, where the ignition system is advanced into the cavity.
FIG. 2E is an enlarged view of the ignition system in FIG. 2D.

FIG. 2D shows a schematic diagram of the plasma generating system 30 where the ignition system 31 is advanced into the cavity or the gas flow tube 50. FIG. 2E is an enlarged view of the ignition system 31 in FIG. 2D. As depicted, high voltage is applied to the electrodes 44a and 44b to generate an electric arc 43, which in turn ionize the gas in the gas flow tube 50. Then, the ionized gas generates a plasma plume 49 in conjunction with the microwave energy inside the waveguide 48. Upon establishing the plasma plume 49, the ignition system 31 is retrieved from the gas flow tube 50, as depicted in FIG. 2A.

Figure 3A:
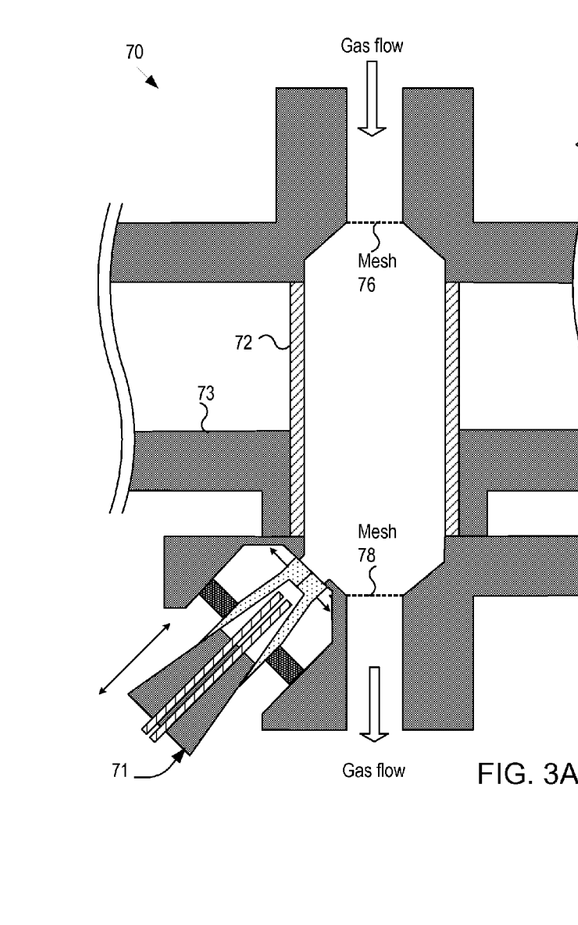
FIG. 3A shows a schematic diagram of a plasma generating system in accordance with another embodiment of the present invention, where an ignition system is retrieved from a cavity.
Figure 3B:
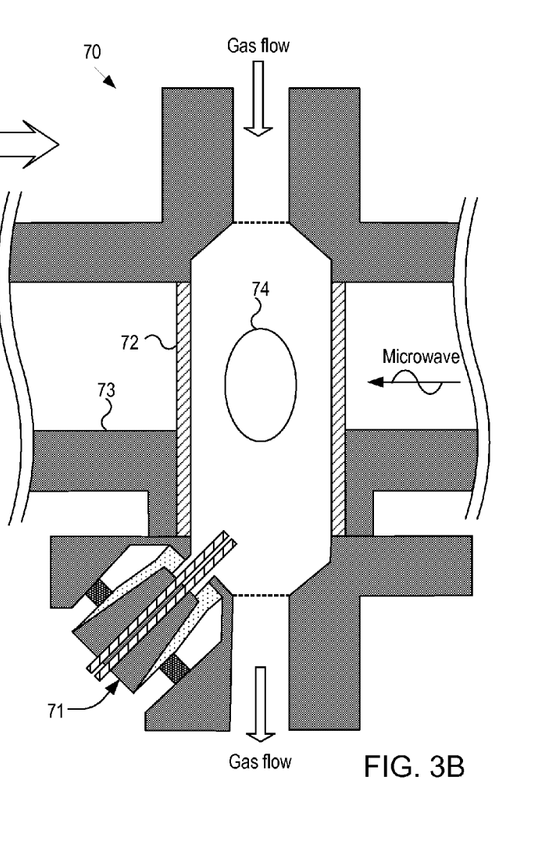
FIG. 3B shows a schematic diagram of the plasma generating system in FIG. 3A, where the ignition system is advanced into the cavity.

FIG. 3A shows a schematic diagram of a plasma generating system 70 in accordance with another embodiment of the present invention, where an ignition system 71 is retrieved from a cavity surrounded by a gas flow tube 72, meshes 76 and 78, and a waveguide 73. FIG. 3B shows a schematic diagram of the plasma generating system 70, where the ignition system 71 is moved into the cavity. The structure and operational mechanisms of the components of the plasma generating system 70 are similar those of their counterparts of the plasma generating system 30, with the difference that the ignition system 71 is located on the bottom part of the plasma generating system 70, i.e., the ignition system 71 is located downstream of the gas flow tube 72 while the ignition system 31 is located upstream of the gas flow tube 50. For brevity, the actuator similar to the actuator 53 is not shown in FIGS. 3A and 3B.

As discussed above, the operational procedure of the plasma generating system 70 is similar to that of the plasma generating system 30. For instance, the ignition system 71 is advanced into the cavity to establish a plasma plume 74, as depicted in FIG. 3B. Then, the ignition system 71 is retrieved from the cavity so that the gates block the leakage of microwave energy from the waveguide 73.

Figure 4A:
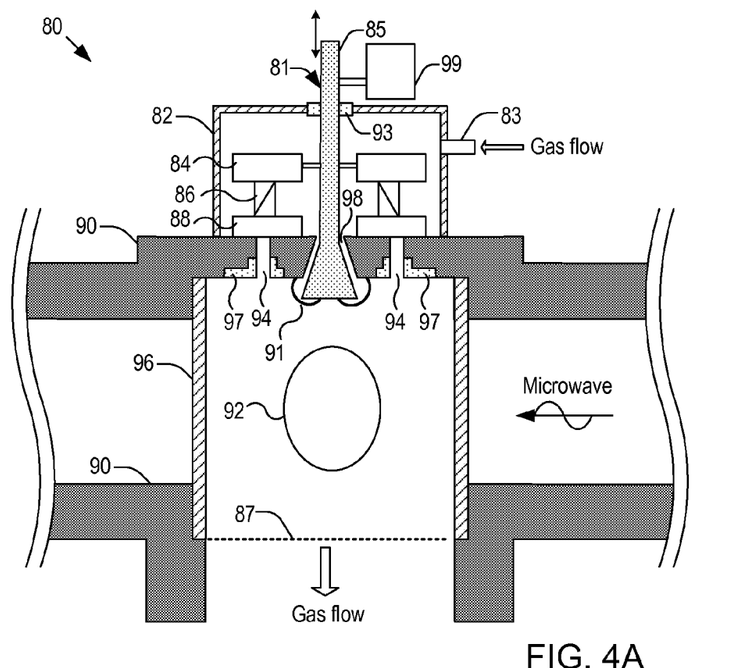
FIG. 4A shows a schematic diagram of a plasma generating system in accordance with another embodiment of the present invention, where an ignition system is advanced into a cavity.
Figure 4B:
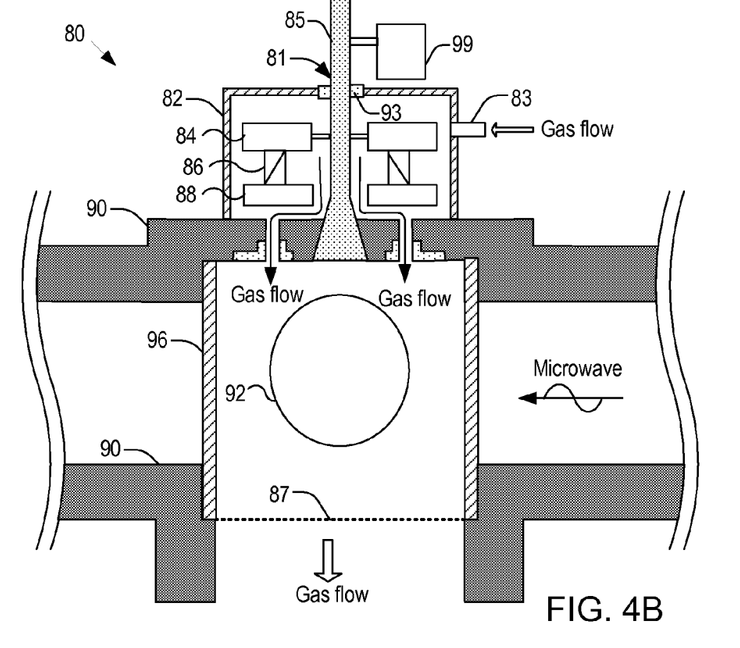
FIG. 4B shows a schematic diagram of the plasma generating system in FIG. 4A, where the ignition system is retracted from the cavity.
Figure 4C:
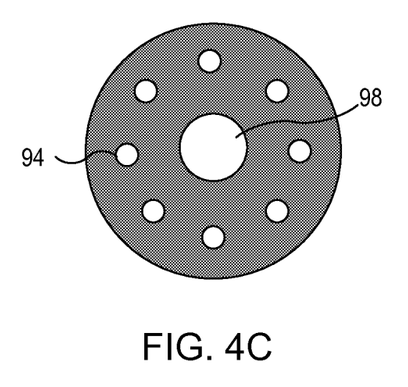
FIG. 4C shows a top view of a portion of the cavity wall in FIG. 4A.
Figure 4D:
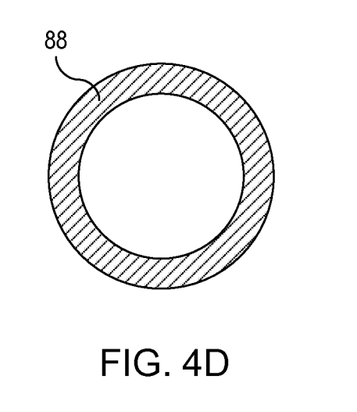
FIG. 4D shows a top view of a seal in FIG. 4A.

FIG. 4A shows a schematic diagram of a plasma generating system 80 in accordance with another embodiment of the present invention, where an ignition system 81 is advanced into a cavity surrounded by the waveguide 90, a mesh 87, and a gas flow tube 96 formed of microwave transparent material, such as quartz. FIG. 4B shows a schematic diagram of the plasma generating system 80, where the ignition system 81 is retrieved from the cavity. FIG. 4C shows a top view of a portion of the wall of the waveguide 90 nearby the throughpass hole 98. FIG. 4D shows a top view of the seal 88 in FIG. 4A.

As depicted in FIGS. 4A-4D, the ignition system 81 includes: an electrode 85 movable upwardly and downwardly; a pressure plate feature 84 secured to the electrode 85; a seal 88; a resilient mechanism 86, such as spring, connected to both the pressure plate feature 84 and the seal 88; a housing 82 forming an enclosed space over the waveguide 90 and having a gas inlet 83, where the housing 82 may be formed of microwave opaque material, such as metal. The electrode 85 is electrically insulated from the housing 82 by an insulating member 93. In an alternative embodiment, the housing 82 and the insulating member 93 are formed on one integral body of dielectric material.

To establish a plasma plume 92, the electrode 85 is moved downwardly so that its conical tip is inside the cavity. Also, the gap between the inner rim of the hole 98 and the outer surface of the electrode 85 forms an ignition gas flow conduit, i.e., the hole 98 and the electrode 85 form a gate for receiving the ignition gas. Then, high voltage is applied to the proximal end of the electrode 85 so that an electric arc 91 is formed at the distal end of the electrode 85. Here, the walls of the waveguide 90 may be grounded to provide a preset electrical potential relative to the electrode 85. Alternatively, a pair of electrodes that is similar to the pair of electrodes 12a and 12b (shown in FIG. 1A) may be used in place of the electrode 85, where the electrodes are insulated from the ground. It is noted that dielectric pads 97 may be attached to the inner surface of the waveguide 90 so that the arc 91 may be restricted to the region near the tip of the electrode 85. Also, the dielectric pads 97 may cover sharp corners of the waveguide 90, obviating inadvertent discharge of electric arc near the corners.

The electric arc 91 may ionize the ignition gas introduce into the gas flow tube 96 through the hole 98. Then, the ionized gas ignites the gas inside the cavity and forms a plasma plume 92 in conjunction with the microwave energy directed into the waveguide 90. During this stage, the pressure plate feature 84 applies a force to the seal 88 so that the seal blocks (or reduces flow through) the holes 94 formed in the waveguide 90, as depicted in FIG. 4A.

In FIGS. 4A and 4B, the hole 98 is used as a gas flow passageway during the ignition process, while the holes 94 are used as a gas flow passageway during the main plasma operation. However, depending on operational conditions, the seal 88 may not completely close the holes 94 during the ignition stage. For example, the gas may flow through both the holes 98 and 94 simultaneously when the high voltage arc 91 is initiated.

Once the plasma plume 92 is established, the electrode 85 is moved upwardly so that the hole 98 is blocked by the conical tip of the electrode 85. Also, the pressure plate feature 84 moves the resilient member 86 upwardly so that the seal 88 unblocks the holes 94, as shown in FIG. 4B. The working gas that flows through the holes 94 is fed into the plasma plume 92 so that the plasma plume is sustained in the cavity. It is noted that the ignition gas introduced through the hole 98 may be different or the same as the working gas introduced through the holes 94.

As depicted in FIG. 4C, a wall of the waveguide 90 includes a plurality of holes 94 for passing the working gas therethrough and the hole 98 for receiving the electrode 85. In one embodiment, the diameter of each hole 94 may be few orders of magnitude smaller than the wavelength of the microwave inside the waveguide 90 so that the microwave energy does not leak through the holes 94. In FIG. 4C, only eight holes are shown. However, it should be apparent to those of ordinary skill in the art that other suitable number of holes may be formed in the waveguide 90.

As depicted in FIG. 4D, the seal 88 has a substantially ring shape so that it can block or restrict the holes 94 when the pressure plate 84 applies a force to the seal 88. The seal 88 may be formed of material, such as metal, that is opaque to the microwave. In an alternative embodiment, the seal 88 may be replaced by multiple valves, such as needle valves, where each valve may control the flow through each of the holes 94.

In an alternative embodiment, the seal 88 may be directly secured to the electrode 85 so that they can be moved as one rigid body. In this embodiment, the pressure plate feature 84 and resilient mechanism 86 may be eliminated from the system 80.

The electrode 85 may be moved upwardly or downwardly by an actuator 99. It should be apparent to those of ordinary skill in the art that the actuator 99 may be of any suitable type, such as electrical actuator. The actuator 99 may be located inside the housing 82.

Figure 5A:
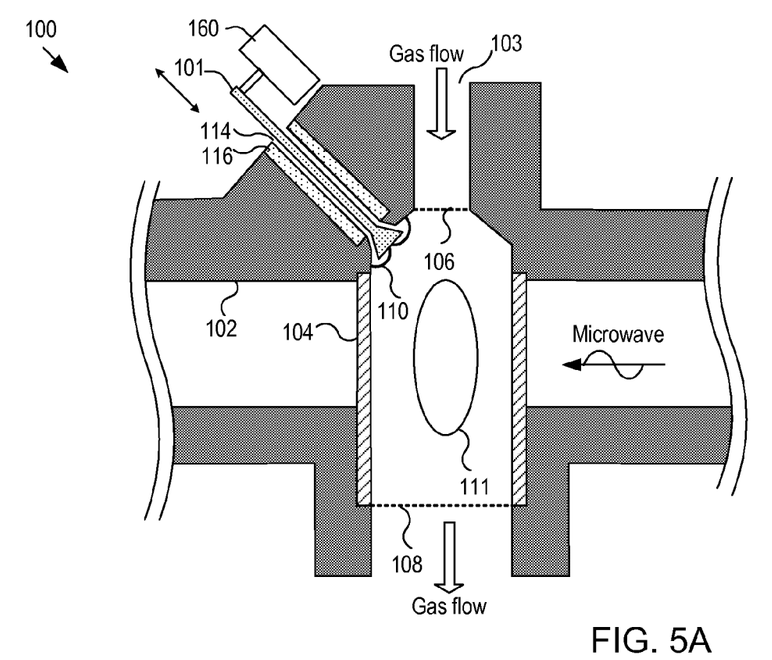
FIG. 5A shows a schematic diagram of a plasma generating system in accordance with another embodiment of the present invention, where an ignition system is advanced into a cavity.
Figure 5B:
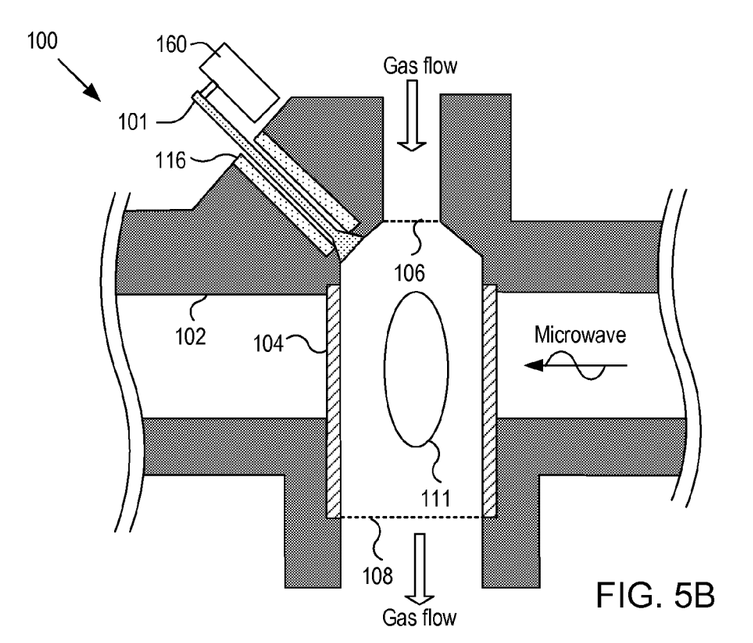
FIG. 5B shows a schematic diagram of the plasma generating system of FIG. 5A, where the ignition system is retrieved from the cavity.

FIG. 5A shows a schematic diagram of a plasma generating system 100 in accordance with another embodiment of the present invention. As depicted, the electrode 101 may be moved so that the conical tip portion is advanced into or retrieved from the cavity formed by the waveguide 102, two meshes 106 and 108; and a gas flow tube 104. The electrode 101, waveguide 102, meshes 106 and 108 may be formed of microwave opaque materials, such as metal. FIG. 5B shows a schematic diagram of the plasma generating system 100, where the tip portion electrode of the electrode 101 is retrieved from the cavity.

To ignite plasma in the cavity, the electrode 101 may be moved toward the cavity by an actuator 160 so that the conical tip portion of the electrode 101 is inside the cavity. Then, high voltage is applied to the electrode 101 to generate an electric arc 110 at the tip of the electrode 101. Then, the gas injected through the hole 103 in the wall of the waveguide 102, which may be a working gas, is transformed into a plasma plume 111 by use of the microwave energy directed to the waveguide 102 according to the ignition mechanism discussed above. To prevent electric arc inside the hole 114, the hole 114 is surrounded by a dielectric pad 116 secured to the inner surface of the waveguide 102.

When the plasma plume 111 is established inside the gas flow tube 104, the electrode 101 is moved so that the conical tip of the electrode 101 is retrieved from the cavity. The conical tip of the electrode 101 is dimensioned to block the hole 114 formed in the waveguide 102 so that the microwave energy does not leak through the hole 114.

It is noted that the ignition gas may flow through the gap between the rim of the hole 114 and the outer surface of the electrode 101 when the electrode 101 is advanced toward the cavity. Alternatively, the ignition gas may be injected through the hole 103. In both embodiments, the working gas is injected through the hole 103.

As depicted in FIGS. 5A-5B, the dielectric pad 116 covers the hole 114, but it does not extend to the inner surface of the waveguide 102 that defines the cavity. Thus, when the electrode 101 is retracted from the cavity by the actuator 160, as shown in FIG. 5B, the conical tip portion of the electrode 101 directly contacts the waveguide 102 so that the electrode 101 is grounded via the waveguide 102. As the electrode 101 and the waveguide 102 are grounded and formed of electrically conducting material, the microwave energy in the cavity would not leak through the hole 114 during operation. It should be apparent to those of ordinary skill in the art that the actuator 160 may be of any suitable type, such as electrical actuator.

Figure 6:
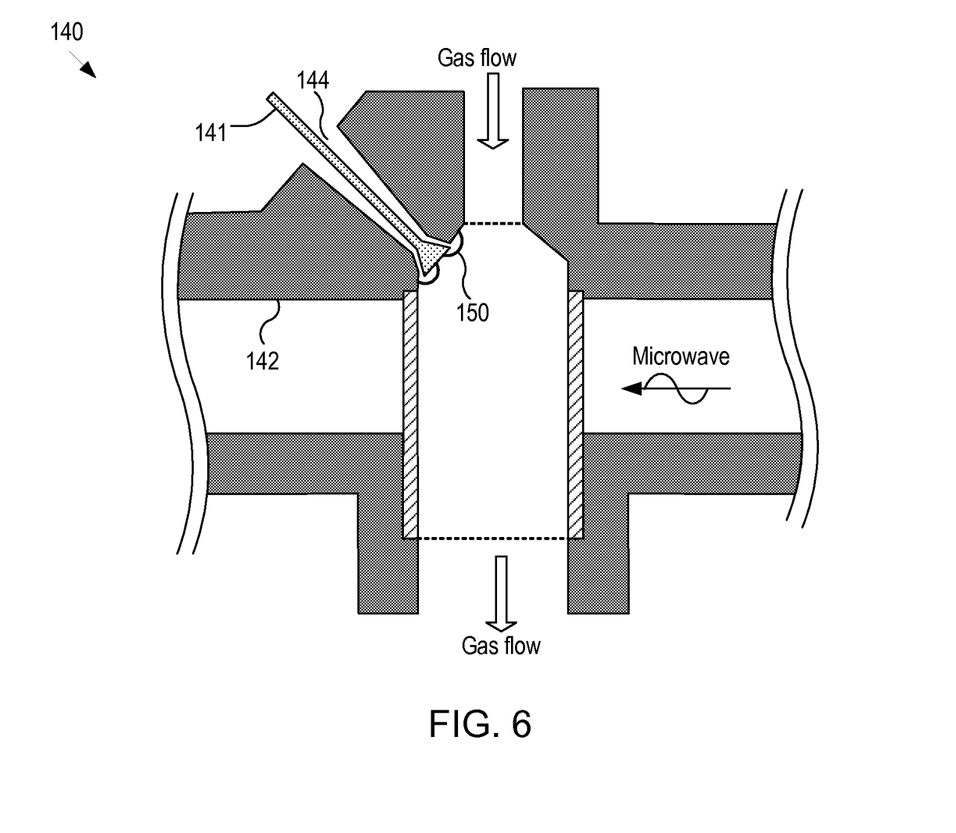
FIG. 6 shows a schematic diagram of a plasma generating system in accordance with another embodiment of the present invention, where an ignition system is advanced into a cavity.

FIG. 6 shows a schematic diagram of a plasma generating system 140 in accordance with another embodiment of the present invention. As depicted, system 140 is similar to the system 100, with the difference that the cross sectional dimension of the hole 144 formed in the waveguide 142 varies along the longitudinal direction of the electrode 141. By varying the cross sectional dimension, the impedance between the electrode 141 and the waveguide 142 is also varied. By making the impedance be minimum near the conical tip portion of the electrode 141, the location of the arc 150 can be limited to the area near the conical tip portion of the electrode 141. For brevity, an actuator for moving the electrode 141 is not shown in FIG. 6, where the actuator may be similar to the actuator 160.

While the present invention has been described with reference to the specific embodiments thereof, it should be understood that the foregoing relates to preferred embodiments of the invention and that modifications may be made without departing from the spirit and scope of the invention as set forth in the following claims.

What is claimed is:

1. A plasma generating system, comprising:
an electrode having a distal end;
a waveguide having a wall, the wall having a hole through which the electrode passes;
an actuator coupled to the electrode and adapted to move the electrode relative to the wall along a first direction to open a gap for receiving a first gas therethrough and along a second direction to close the gap;
the wall having at least one opening for receiving a second gas therethrough; and
a gas control mechanism for opening and closing the at least one opening to control a flow of the second gas through the at least one opening;
wherein the electrode and the wall are configured to couple to a power supply to have an electrical potential between the distal end and a portion of the wall surrounding the hole and, using the electrical potential, generate an electric arc therebetween to thereby ignite the first gas into a plasma during operation.

2. A plasma generating system as recited in claim 1, further comprising:
a gas flow tube disposed in the waveguide and having an inlet for receiving the first and second gas.

3. A plasma generating system as recited in claim 2, wherein the gas flow tube has an outlet, further comprising:
a mesh disposed in the outlet of the gas flow tube and configured to block leakage of microwave energy in the waveguide.

4. A plasma generating system as recited in claim 1, wherein the first gas is an ignition gas and the second gas is a working gas.

5. A plasma generating system as recited in claim 1, further comprising:
a dielectrical pad covering the hole to thereby electrically insulate the wall of the waveguide from the electrode.

6. A plasma generating system as recited in claim 1, wherein the distal end has a generally conical shape so that the gap is closed as the electrode is retracted from the waveguide.

7. A plasma generating system as recited in claim 1, further comprising:
a mesh disposed in the at least one opening and configured to block leakage of microwave energy in the waveguide.

8. A plasma generating system as recited in claim 1, wherein a cross sectional dimension of the hole varies along a longitudinal direction of the electrode.

* * * * *